Sept. 18, 1928.
H. L. HONOHAN
AUTOMOBILE ALARM
Filed June 21, 1927
1,685,073
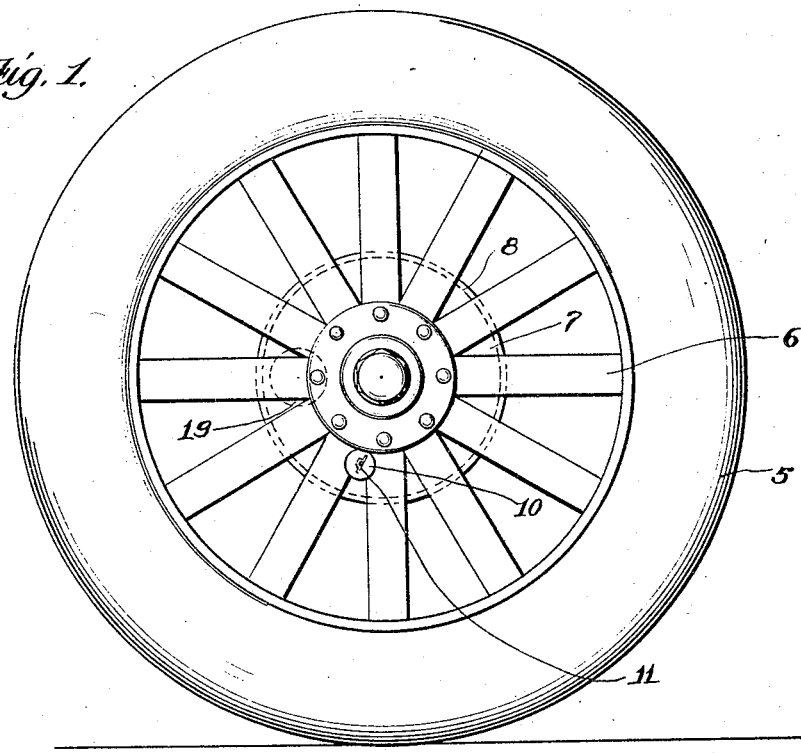
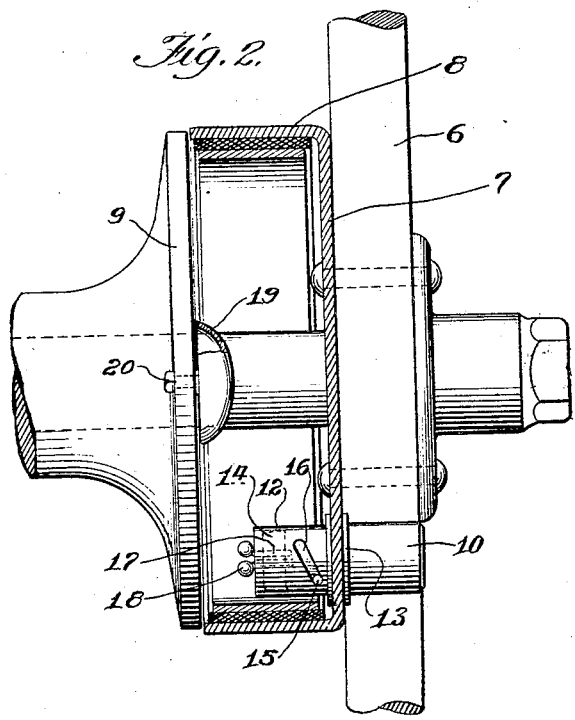
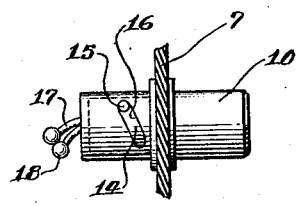
Inventor
HERBERT L. HONOHAN Patented Sept. 18, 1928.

1,685,073

UNITED STATES PATENT OFFICE.

HERBERT L. HONOHAN, OF CHICAGO, ILLINOIS, ASSIGNOR TO WILLIAM D. HONOHAN, OF CHICAGO, ILLINOIS.

AUTOMOBILE ALARM.

Application filed June 21, 1927. Serial No. 200,415.

My invention relates to the necessary provision for automobiles of means to prevent or anticipate theft, and it is my main object to provide an appliance which will sound an alarm as the theft of the automobile is attempted.

A further object of my invention is to locate the novel alarm in a position where it will receive the best motion for its proper operation.

A still further object of my invention is to locate the control for the novel alarm in a handy position.

Another object of the invention is to attach the novel alarm to the automobile without requiring radical changes in the latter.

A final, but nevertheless important object of the invention is to design the same with few and simple parts, that it may be inexpensive to manufacture and easy to install and operate.

In the application of theft-preventing devices to automobiles, it has been customary to use locks for the disabling of the steering wheel, transmission gear, etc., but it is well known that the skilled automobile thief usually manages to circumvent these measures by one method or another, and succeeds in getting the automobile away. It is my belief, however, that if a suitable alarm were applied where it would get into action as the automobile gets underway, by-passers and the authorities would be attracted by the noise and would thereby have notice that the machine is operating under unusual conditions.

In order that my invention may be better understood, I will refer to the accompanying drawing, in which—

Fig. 1 shows that member of the automobile to which my alarm is applied, the same being one of the rear wheels;

Fig. 2 is an enlarged cross section of the central portion of the wheel, showing the alarm apparatus more clearly; and Fig. 3 is a detail of the alarm actuator in position for sounding the alarm.

Referring specifically to the drawing, 5 denotes a standard automobile wheel to which I apply the novel alarm. As usual, the wheel is built on a cluster of spokes 6, to which is bolted the frontal portion of the drum 8 upon which the brakes are exerted. This drum is hollow, and opposite the mouth thereof is the usual spider 9 of the axle which carries the braking mechanism. The spider is slightly spaced from the mouth of the drum 8. In applying my invention to the above structure, I build a cylinder lock 10 at a convenient point between two spokes, said lock having its key slot 11 at the front for ready access by applying the proper key. The cylinder 10 is extended inwardly through the wall 7 of the brake drum, as shown at 12, proper securing flanges 13 or other means being used to fasten the cylinder to the wall 7. Within the inner portion 12 of the cylinder 10 is a movable plunger 14, which receives the turning impulse of the lock as the key is rotated in front. By means of a pin 15 carried by the plunger 14 and extended through a diagonal slot 16 in the cylinder 10, the plunger is caused to advance in an inward direction as the key is turned in the unlocking direction. The inner end of the plunger carries two pivotally attached stems 17, which extend from the inner end of the cylinder extension 12, and carry metallic enlargements or balls 18. The stems 17 may be of a flexible character such as wire cable. The frontal face of the spider 9 receives a gong 19 secured by a central bolt 20, or in any other suitable manner.

It will be seen that when the key (not shown) is turned whereby to project the plunger 12 inwardly, the stems 17 will move into a position opposite the gong 19 so that when the cylinder is revolved by the rotation of the wheel with the brake drum, relative to the spider 9 which is stationary with the axle, the balls 18 will act as hammers to strike the gong at each revolution. Thus, a loud alarm will be sounded, and owing to the spacing of the brake drum 8 from the spider 9 will be readily heard by those in the vicinity of the automobile. On the other hand, when it is desired that the alarm be ineffective, the key is turned in the opposite direction to draw the hammer element back and out of the way of the gong 19. Considered as a lock, the device is manipulated reversely to the average automobile lock; that is, it is unlocked when it is desired that it function as an alarm, and locked when it is to be inactive, such as when the owner or driver desires to use the machine.

It will be evident that my invention provides a very simple apparatus for the use contemplated, and the appliance should discourage any thief after he has started the machine since the chances of detection would be very apparent. The appliance has no bearing on any vital gearing in the machine, so that even should it be disabled in some manner by the thief it would occasion no harm to the mechanism which is essential for the operation thereof. The device is readily accessible, since it is easy for the driver to approach the proper wheel once he has alighted from the machine, and as equally easy to approach the same wheel to render the alarm ineffective when he again desires to resume his travel. In conclusion the apparatus is extremely simple, and once installed should render long service and be dependable.

I claim:

1. An automobile theft alarm comprising a gong carried by the spider at one end of the axle, a lock in the brake drum and operated by a key applied externally of the wheel said lock comprising a cylinder rotated by the lock and having a side pin, a cylindrical shell housing the cylinder and projecting laterally from the wheel toward the spider and having a spiral slot accommodating the side pin, and a striking element extending from the cylinder through the shell and adapted to sound said gong when the brake drum rotates with the cylinder in advanced position in the path of said gong.

2. An automobile theft alarm comprising a cylindrical housing extending laterally from the wheel of an automobile toward the spider, said housing having a spiral slot therein, a cylindrical member in said housing and movable longitudinally thereof, a pin extending from said member and projecting through said slot, striking elements attached to said cylindrical member and projectable from and retractable into said housing by the movement of said cylindrical member, a gong on the spider adjacent the wheel in the path of rotation of said striking element when extended from the housing.

3. In combination, an automobile theft alarm comprising a sounding element carried by the spider at the end of the axle, a striking element carried by the inner surface of the brake drum and rotatable in a path alined with said sounding element, and means for moving said striking element in an axial direction into and out of the path of said sounding element whereby to periodically engage the same in the rotation of the wheel.

4. The combination set forth in claim 3, and said striking element having means comprising a key operated cylinder from the end of which said striking elements protrude, said cylinder and brake drum having cooperating interengaging means whereby said cylinder will be advanced or retracted when turned.

In testimony whereof I affix my signature.

HERBERT L. HONOHAN.